US009887764B1

(12) United States Patent
Karim

(10) Patent No.: US 9,887,764 B1
(45) Date of Patent: Feb. 6, 2018

(54) SYSTEMS FOR HARVESTING, STORING, AND SHARING DATA FILES

(71) Applicant: Syed Karim, Chicago, IL (US)

(72) Inventor: Syed Karim, Chicago, IL (US)

(*) Notice: Subject to any disclaimer, the term of this patent is extended or adjusted under 35 U.S.C. 154(b) by 0 days.

(21) Appl. No.: 15/092,878

(22) Filed: Apr. 7, 2016

Related U.S. Application Data

(60) Provisional application No. 62/143,829, filed on Apr. 7, 2015.

(51) Int. Cl.
*H04H 20/74* (2008.01)
*H04B 7/185* (2006.01)
*H04L 12/28* (2006.01)
*H04L 12/931* (2013.01)
*H04W 84/12* (2009.01)

(52) U.S. Cl.
CPC ..... *H04B 7/18517* (2013.01); *H04L 12/2856* (2013.01); *H04L 49/503* (2013.01); *H04W 84/12* (2013.01)

(58) Field of Classification Search
CPC ............ H04B 7/18523; H04B 7/18513; H04B 7/18508; H04B 7/1851; H04B 7/18515; H04B 7/18534; H04B 7/18528; H04B 7/18578; H04H 20/51; H04H 20/74; H04H 40/90; H04H 220/14; H04W 84/06
USPC ............................. 455/3.02, 427, 12.1, 412.1
See application file for complete search history.

(56) References Cited

U.S. PATENT DOCUMENTS

| | | | | |
|---|---|---|---|---|
| 5,929,808 A * | 7/1999 | Hassan | ............... | H01Q 1/1257 342/359 |
| 6,141,530 A * | 10/2000 | Rabowsky | ......... | H04N 7/17345 348/436.1 |
| 6,751,713 B1 * | 6/2004 | Guo | ..................... | H04N 5/4401 348/E5.097 |
| 6,763,393 B2 * | 7/2004 | Hirosawa | .......... | G06F 17/30864 707/E17.108 |
| 2003/0074470 A1 * | 4/2003 | Karino | ............. | H04L 29/12009 709/239 |
| 2004/0044657 A1 * | 3/2004 | Lee | ..................... | G06F 17/3087 |
| 2004/0183673 A1 * | 9/2004 | Nageli | ................. | G01S 5/0018 340/539.13 |
| 2006/0160553 A1 * | 7/2006 | Piirainen | .................. | H04L 5/06 455/517 |
| 2006/0184989 A1 * | 8/2006 | Slothouber | ....... | G06F 17/30861 725/110 |
| 2006/0274153 A1 * | 12/2006 | Levien | .............. | H04N 1/00132 348/207.1 |

(Continued)

*Primary Examiner* — Dominic Rego

(57) ABSTRACT

A system for obtaining data files from a plurality of third party servers and transmitting the data files to a plurality of users is disclosed. The system includes at least one server, at least one satellite, and a plurality of local storage devices. The server is configured to download and save data files from a plurality of third party servers via an Internet connection and then directly communicate the data files to the satellite, which is configured to then relay the data files as radio frequency signals to the local storage devices. Each local storage device is configured to (i) receive and decode the radio frequency signals, (ii) store decoded radio frequency signals as transmitted data files, and (iii) render the transmitted data files accessible to at least one user computing device through a wireless network connection.

4 Claims, 4 Drawing Sheets

(56) References Cited

U.S. PATENT DOCUMENTS

| | | | | |
|---|---|---|---|---|
| 2007/0180367 A1* | 8/2007 | Chiang | | G06F 17/30905 715/234 |
| 2009/0201169 A1* | 8/2009 | d'Hont | | G01S 13/003 340/8.1 |
| 2009/0204721 A1* | 8/2009 | Yost | | G06F 15/167 709/232 |
| 2009/0219437 A1* | 9/2009 | Baugher | | H04N 21/23424 348/385.1 |
| 2010/0177687 A1* | 7/2010 | Sung | | H04L 5/0007 370/328 |
| 2010/0240314 A1* | 9/2010 | Chang | | H04W 8/005 455/67.11 |
| 2011/0008761 A1* | 1/2011 | Hakopian | | G09B 5/065 434/308 |
| 2012/0211058 A1* | 8/2012 | Chen | | H01Q 1/2208 136/251 |
| 2013/0007119 A1* | 1/2013 | Zarka | | H04L 69/14 709/203 |
| 2013/0049674 A1* | 2/2013 | Davis | | B60L 11/182 320/101 |
| 2013/0084919 A1* | 4/2013 | Glynn | | H04B 1/3833 455/566 |
| 2013/0305297 A1* | 11/2013 | Jabara | | H04N 21/2365 725/75 |
| 2014/0062381 A1* | 3/2014 | Teggatz | | H02J 7/0052 320/101 |
| 2014/0116077 A1* | 5/2014 | Pierce | | B60L 1/02 62/235.1 |
| 2014/0334435 A1* | 11/2014 | Al-Shalash | | H04W 8/005 370/330 |
| 2014/0359078 A1* | 12/2014 | Liu | | H04L 65/80 709/219 |
| 2015/0181009 A1* | 6/2015 | Nakabayashi | | H04M 1/04 455/575.1 |
| 2015/0181286 A1* | 6/2015 | Gonzalez | | H04N 21/6143 725/28 |
| 2015/0317501 A1* | 11/2015 | Safai | | G06K 7/10366 340/5.8 |
| 2015/0355334 A1* | 12/2015 | Stubbs | | G01S 19/02 342/357.395 |
| 2015/0373065 A1* | 12/2015 | Holmquist | | H04L 65/403 715/753 |
| 2016/0078071 A1* | 3/2016 | McCoy | | G06F 11/3065 707/741 |
| 2016/0182579 A1* | 6/2016 | Tsang | | H04L 65/4023 709/204 |
| 2017/0034250 A1* | 2/2017 | Sobhani | | H04B 7/18521 |

\* cited by examiner

SYSTEMS FOR HARVESTING, STORING, AND SHARING DATA FILES

CROSS-REFERENCE TO RELATED APPLICATIONS

This application claims priority to and incorporates by reference U.S. provisional patent application Ser. No. 62/143,829, filed on Apr. 7, 2015.

FIELD OF THE INVENTION

The field of the present invention relates to systems and methods for harvesting, storing, and sharing data files, which allow a plurality of users to consume Internet-derived content in the absence of an Internet connection.

BACKGROUND OF THE INVENTION

For many years, the Internet has provided a rich source of information and has represented a continually growing means for communication among a large global population. Indeed, for those with ongoing and affordable access to an Internet network connection, the Internet continues to inform, educate, entertain, and enable communication among hundreds of millions of people. Unfortunately, however, there remains a large portion of the world population that does not have ongoing and reliable access to the Internet, due to economic conditions, insufficient network coverage, and other reasons.

As such, there is a continuing and significant demand for new and improved systems and methods that allow an underserved population to access and consume the type of information and data that others enjoy and routinely extract from the Internet. Such systems and methods will serve to educate and better the lives of millions of people who do not have reliable access to the Internet (and the educational benefits that it provides). In addition, the systems and methods will have further utility among those who typically do have Internet access, when such individuals are traveling or otherwise located in geographical areas with poor network coverage.

As the following will demonstrate, the systems and methods of the present invention and those described herein address many of these demands (and others) in the marketplace.

SUMMARY OF THE INVENTION

According to certain aspects of the invention, a system for obtaining data files from a plurality of third party servers and transmitting those data files to a plurality of users is provided. More specifically, for example, the system will include at least one system server that is configured to download and save data files from a plurality of third party servers via an Internet connection, e.g., download data files that are associated with a variety of third party websites. The invention provides that the system server will further be configured to then directly communicate the data files to one or more satellites in the form of radio frequency signals. In certain embodiments, the system is configured to automatically and directly communicate the data files to one or more satellites that are not being used at full capacity (versus those satellites that are operating at or near full capacity). The invention provides that the one or more satellites will be configured to then relay the data files (in the form of radio frequency signals) to a plurality of local storage devices.

According to further aspects of the invention, each local storage device is configured to receive and decode the radio frequency signals, store the decoded radio frequency signals as transmitted data files, and then render the transmitted data files accessible to at least one user computing device through a wireless (WiFi) connection. As described in further detail below, the invention provides that each local storage device will include a radio frequency module and a compute module. The radio frequency module—through an integrated antenna that is configured to receive the radio frequency signals from the satellite—is configured to receive the radio frequency signals from the satellite and then transfer the radio frequency signals to the compute module (both the radio frequency and compute modules are housed within the same local storage device). In addition, the invention provides that the radio frequency module will be configured with wide band software, which is capable of demodulating multiple types of waveforms.

The invention provides that the compute module is configured to decode the radio frequency signals into transmitted data files and store the transmitted data files for future consumption by users. In addition, the compute module within each local storage device is further configured to establish a wireless (WiFi) network connection with at least one user computing device (and, in some cases, a plurality of user computing devices). The invention provides that the compute module is configured to provide access to selected transmitted data files to at least one user computing device through the wireless network connection (the compute module is also configured to regulate power usage and provide central processing unit (CPU) functionality). Accordingly, each local storage device allows a user to obtain copies of and review data files that originated from the plurality of third party servers from which the system server downloaded such data files (and, because the data transfer occurs between the local storage device and the user computing device, an Internet connection is not required for users to consume such data).

According to still further aspects of the present invention, each local storage device will preferably include one or more rechargeable batteries. Still further, each local storage device may include one or more solar panels that are configured to generate power for the local storage device. In addition, according to certain embodiments, each local storage device will preferably include a user interface that indicates whether the local storage device is currently (a) receiving radio frequency signals from the satellite and/or (b) transmitting copies of selected transmitted data files to at least one user computing device. Still further, each local storage device may be equipped with a beacon signal functionality, which operates to inform users and local devices of (i) changes to signal frequencies, schedules, and waveforms, (ii) openings in transmit schedules (to prevent collisions during bi-directional communications), (iii) a location of the satellite at a defined point in time, or (iv) a combination of the foregoing.

According to yet further aspects of the present invention, methods for harvesting, storing, and transmitting data files (which originate from various third party servers and websites) to a plurality of users are provided. In such embodiments, the methods generally include operation of the systems, and particularly the local storage devices, which are described herein and represent an embodiment of the claimed invention.

The systems and methods of the present invention set forth above are described in further detail below in the Detailed Description of the Invention section.

DETAILED DESCRIPTION OF THE INVENTION

Figure 1:
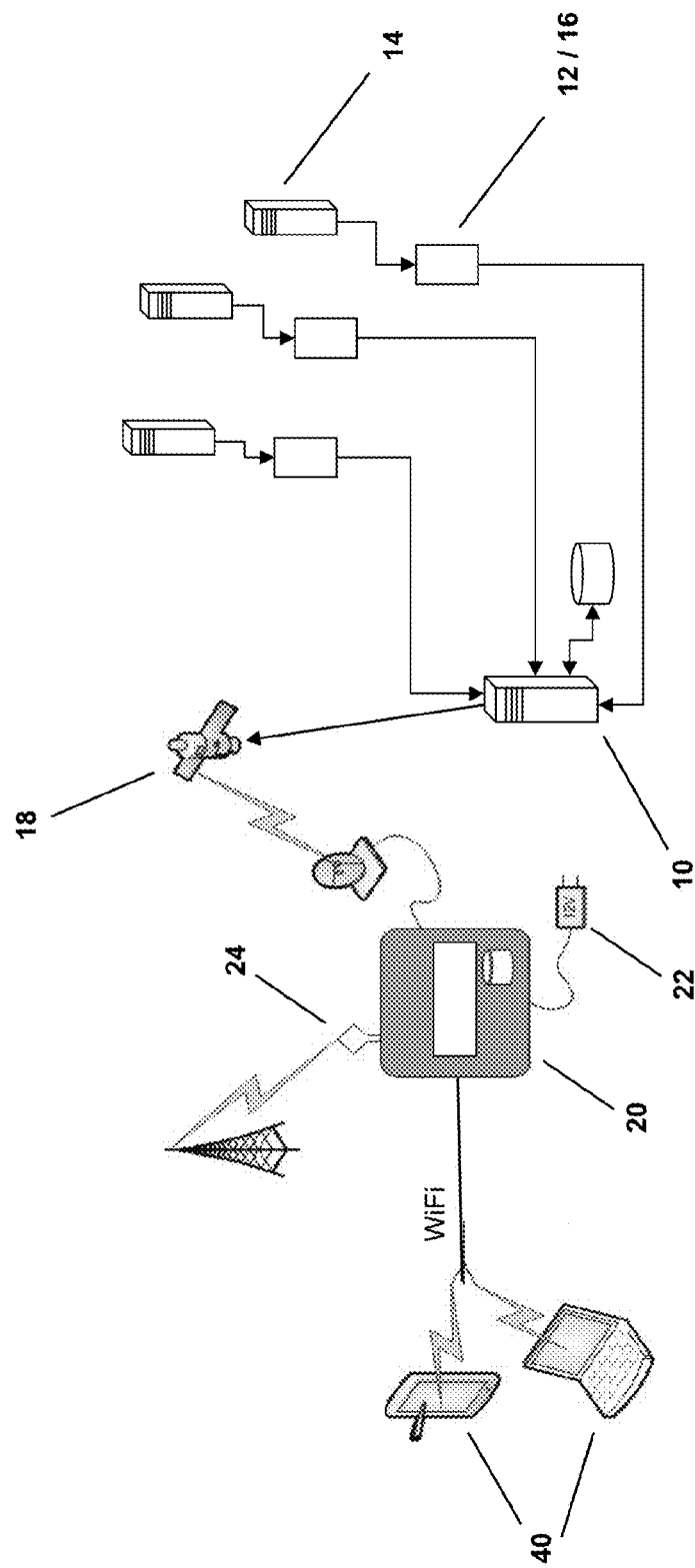
FIG. 1 is a diagram showing various components of the system described herein, namely, the system server, satellite, local storage device (in stationary form), and user computing device described herein.
Figure 2:
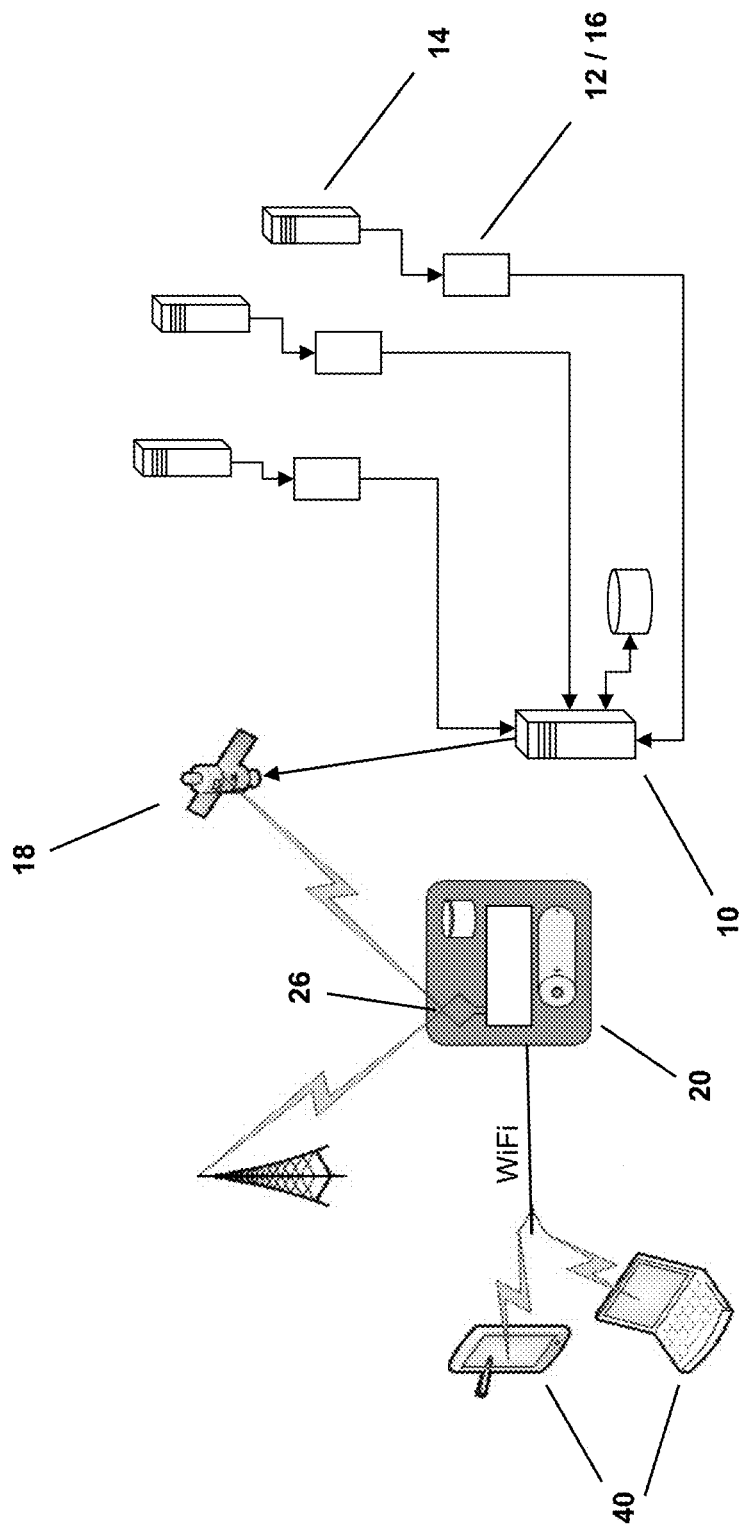
FIG. 2 is another diagram showing various components of the system described herein, namely, the system server, satellite, local storage device (in mobile form), and user computing device described herein.

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Referring now to FIGS. 1-4, according to certain preferred embodiments of the present invention, a system for obtaining data files (e.g., data files associated with informational websites) from a plurality of third party (hosting) servers and transmitting those data files to a plurality of users is provided. The system will include at least one system server 10 that is configured to download and save data files 12 from the plurality of third party servers 14 via an Internet connection, e.g., download data files 12 that are associated with a variety of third party informational websites 16. The invention provides that the system server 10 will further be configured to then directly communicate the data files 12 to one or more satellites 18 in the form of radio frequency signals. In certain embodiments, the system is configured to automatically and directly communicate the data files 12 to one or more satellites 18 that are not being used at full capacity (versus those satellites 18 that are operating at or near full capacity). The one or more satellites 18 are preferably configured to then relay the data files 12 (in the form of radio frequency signals) to a plurality of local storage devices 20.

According to certain preferred embodiments of the invention, the local storage device 20 may exist in two different configurations—specifically, a stationary (FIG. 1) and mobile (FIG. 2) configuration. When the local storage device 20 is configured to be stationary (FIG. 1), the device may be powered through a fixed and long-term power source 22, the device may utilize external antennas 24, and (as described herein) the device 20 will be configured to share the harvested data files 12 with other user computing devices 40 via a wireless (WiFi) connection. When the local storage device 20 is configured to be mobile (FIG. 2), the device 20 will utilize its own internal power source and, therefore, will preferably be configured to power off (or power down) components that are not required at a particular point in time (e.g., when the device is not being used to review data files 12), in order to maximize battery life (while still enabling the device 20 to harvest data files 12 via internal antennas 26 as described herein).

Figure 3:
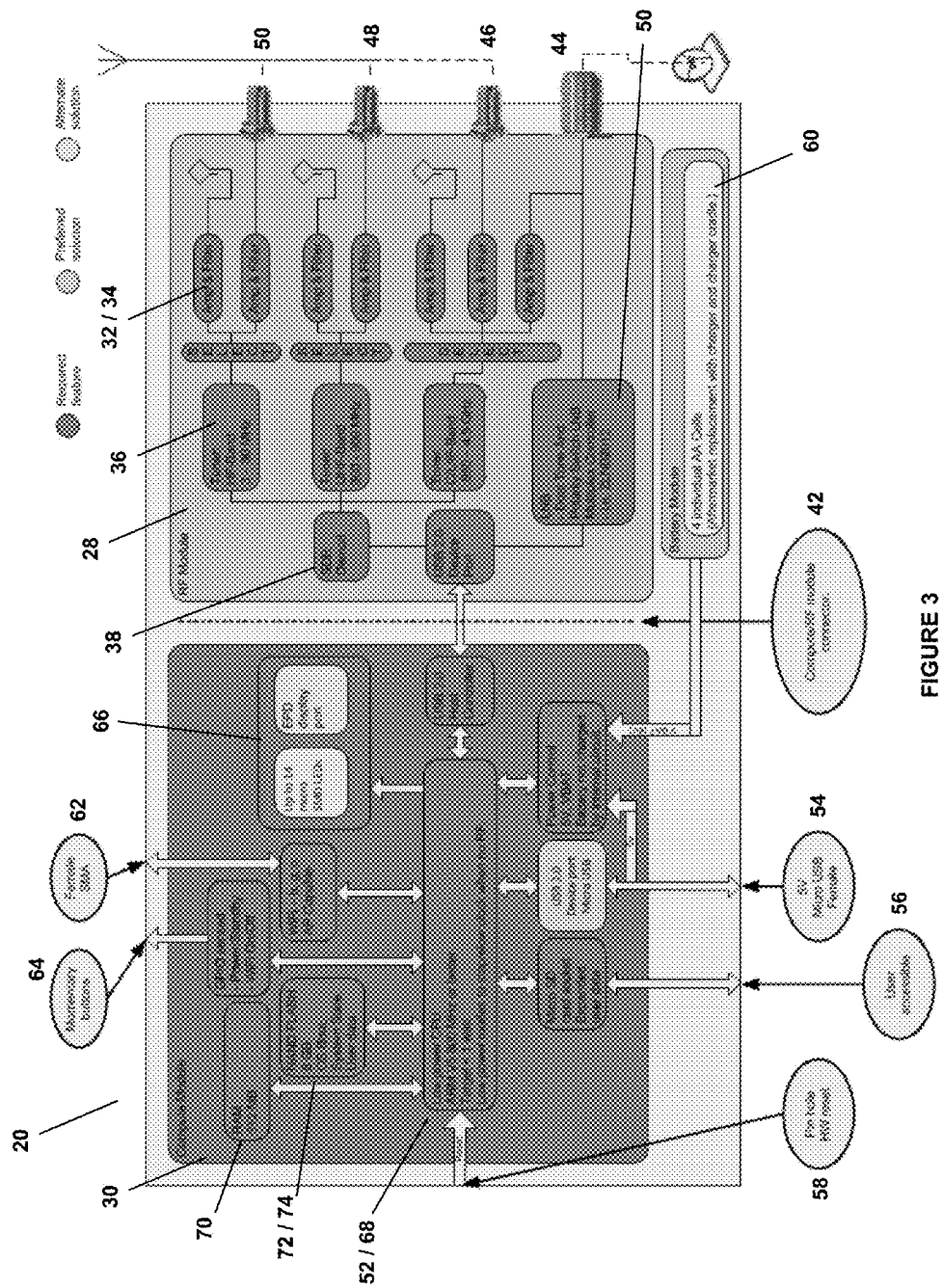
FIG. 3 is a diagram of the local storage device described herein, particularly showing the various components of the radio frequency module and compute module of each local storage device.

Referring now to FIG. 3, the local storage device 20 comprises two primary modules, namely, a radio frequency module 28 and a compute module 30. The radio frequency module 28 is preferably configured to receive radio frequency signals from the satellite 18 and then transfer the radio frequency signals to the compute module 30. The radio frequency module 28 is equipped with one or more internal antennas 26 (or connections to internal antennas 26), optional connections to external antennas 24, and other components for signal amplification 32, signal filtering 34, tuning 36, and demodulation 38. The invention provides that the demodulation component 38 preferably includes a hardware-assisted software-defined radio (SDR), which is configured to enable the device 20 to utilize the same radio for multiple transmitters and modulation types. In addition, the invention provides that the radio frequency module 28 will be configured with wide band software, which is capable of demodulating multiple types of waveforms.

The invention provides that the compute module 30 is configured to execute a number of important functions. More specifically, for example, the compute module 30 is configured to (i) decode the radio frequency signals into transmitted data files and store the transmitted data files for future consumption by users; (ii) establish a wireless (WiFi) connection with at least one user computing device 40 (and, in some cases, a plurality of user computing devices 40), i.e., the compute module 30 is configured to both receive and emit data files; (iii) transmit copies of selected transmitted data files to at least one user computing device 40 through the wireless network connection; (iv) regulate power usage and distribution within the device 20; and (v) provide other central processing unit (CPU) functionality. The radio frequency module 28 and the compute module 30 are described in further detail below.

The Radio Frequency ("RF") Module

The RF module 28 represents the hardware and circuitry within the local storage device 20 that enables the device 20 to receive data (radio frequency signals) from the one or more satellites 18. The RF module 28 may be configured to support one or multiple radio frequency bands. Table-1 below identifies certain radio frequency bands (and, in some cases, a suitable modulation scheme) that may be used for each band. In certain alternative embodiments, the invention provides that the radio frequency band may be tuned as desired.

TABLE 1

| Target Range IEEE Band | Modulation | Antenna |
| --- | --- | --- |
| 535 kHz to 1705 kHz MF Band | | Internal only |
| 3-30 MHz HF/MW Band | DRM, MFSK, PSK | Internal and dedicated SMA to external |
| 300-700 MHz 400 - MHz UHF | GMSK, 8PSK (FM) | Internal and dedicated SMA to external |
| 1.5-1.6 GHz L Band 2.2-2.5 GHz S Band | QPSK | Internal and shared SMA to external |
| 3.7-4.5 GHz C Band | Spread spectrum | Internal and shared SMA to external |
| 12-18 GHz Ku Band Via LNB IF (950-2150 MHz) | DVB-S: BPSK, QPSK, 8PSK, 16QAM DVB-S2: | Cabled to dish via dedicated F connector |

TABLE 1-continued

| Target Range IEEE Band | Modulation | Antenna |
|---|---|---|
| L-Band tuning | BPSK, QPSK, 8PSK, 16APSK, 32APSK | |

The invention provides that the RF module 28 is configured to communicate with the compute module 30 via a universal serial bus (USB) 2.0 high speed bus 42. The invention provides that the USB power may be disconnected from the compute module 30 at any time. The invention provides that the demodulated data will preferably be in the form of an MPEG transport stream, and will preferably be subject to a transport stream, proportional-integrative-derivative (PID) filter—which serves to reduce the amount of data that is transferred and processed by the compute module 30, thereby lowering the main central processing unit (CPU) requirements and power consumption. In such embodiments, at least four (4) simultaneous PID filter ranges would be sufficient, with eight (8) simultaneous PID filter ranges being preferred.

The invention provides that the RF module 28 will preferably be configured to shield all RF-sensitive components of the local storage device 20, in order to protect such components from the WiFi transmitter and inadvertent CPU module radiation (within the compute module 30). In addition, the invention provides that the internal antennas 26 will provide reception under suitable operating conditions (an external antenna 24 may be utilized when operating conditions are less than suitable). Referring to FIG. 3, in certain embodiments, the RF input of the RF module 28 may be divided into four connections, namely, (1) a 75 ohm F connector 44 for connecting to the L-Band output of a satellite dish low-noise-block (LNB) (providing a dedicated port to ensure the tone and polarization power is not output to an incompatible antenna); (2) a 50 ohm female subminiature version-A (SMA) connector 46 for use with an Inmarsat or Iridium antenna; (3) a 50 ohm female SMA connector 48 for ultra-high frequency (UHF) signals; and (4) a 50 ohm female SMA connector 50 for high-frequency medium-wave (HF/MW) band reception. The invention provides that all antenna connectors will preferably be mounted directly to the RF module 28 printed circuit board (PCB). The internal antennas 26 can be PCB-mounted as well, or integrated into the enclosure and connected to the module 28 via the appropriate h.fa or solder points.

The invention provides that, preferably, the RF module 28 power consumption will be less than 1 watt. The RF module 28 will preferably be configured to control the DC voltage on the F connector to select the LNB 50 polarization. Such power will originate from the compute module 30 and is provided via a dedicated power source. The CPU processor 52 application will be configured to enable and disable the use of the LNB power.

The Compute Module

According to certain preferred embodiments, the compute module 30 will be based on a low power system-on-chip (SOC) that can provide a sufficient CPU 52 to process a 15 Mb/s carousel (data pipe), while also serving data to WiFi clients (to user computing devices 40). The compute module 30 may comprise several connections to various components within the local storage device 20, including (1) solder pads or u.fl connectors for WiFi internal antenna, (2) PCB-mounted SMA connectors 62 to WiFi external antenna, (3) female micro-USBs 54 for use as power ports and device ports, (4) micro secure digital (SD) card slots 56, (5) user interface buttons 64, pinholes 58, and tactile controls, (6) female right angle headers for the RF module 28, and (7) power connectors 60 for an AA (Mignon) battery pack.

The invention provides the device 20 power enters via the compute module 30. Power source selection, power conditioning, voltage conversion, and power control are all provided by the compute module 30 hardware. As illustrated in FIG. 3, the compute module 30 comprises many of the same components as an independent computing device, including boot medium, memory, and expansion storage (SD card). The compute module 30 provides connectivity to the RF module 28 and peripherals via two USB host controllers 42. The invention provides that the compute module 30 also contains a USB device port/power port 54. When connected to a standard USB host, the invention provides that certain features may be disabled to reduce power consumption to less than 500 ma. In that case, software within the local storage device 20 will emulate a USB network adapter and provide sufficient functionality to allow the host device to access previously downloaded data over the USB. The WiFi hardware will preferably support access via point mode. A display 66 is enabled via an electronic paper display (EPD) port to an e-ink display or via a collection of light-emitting diodes (LEDs) through a vinyl overlay.

The invention provides that an 800 MHz ARM V5 (microprocessor 68) or 700 MHz ARM V6 is sufficient to operate the device 20, although a 1.2 GHz ARM V5 or greater is preferred (which can be influenced by various factors, including CPU speed, memory speed, cache size, bus bandwidth, and storage speeds). In certain embodiments, the device 20 may be configured with at least 512 MB of RAM 70, e.g., DDR2 800 MHz SDRAM. The invention provides that boot from a NAND 72 or SD card may be employed, with NAND 72 being preferred. If an SD card is employed, the SD card will preferably be hidden from a user and a second SD card will be provided for user access (to avoid having the boot operating system on a user removable SD card). Still further, the invention provides that the device 20 will preferably include approximately 8 GB of user storage 74. Such storage may be included on the boot media or provided via an SD card. The local storage device 20 WiFi functionality will typically require access point mode; however, in certain cases, the device 20 may be configured to operate in client mode. In order to provide the desired WiFi functionality to enable sharing of transmitted data files with user computing devices 40, the compute module 30 will preferably support B, G & N modes.

The invention provides that the micro-USB device 20 port/power port 54 may be used for both power and connectivity. As mentioned above, the compute module 30 is connected to the RF module 28 via a 2 mm right angle header. A high speed USB 2.0 bus 42 is preferably used to control and stream data from the RF module 28 to the compute module 30. In such embodiments, the invention provides that 5V, data+, data−, and ground are the primary connections required (although additional grounds may be included for shielding purposes). The invention provides that USB power will be used to drive the entire RF module 28, including the tone and polarity switch used to control the LNB 50. The invention provides that during boot procedures, all power to the RF module 28 will preferably be terminated, with restoration of power being subject to software controls.

Additional Hardware and Software Elements

Figure 4:
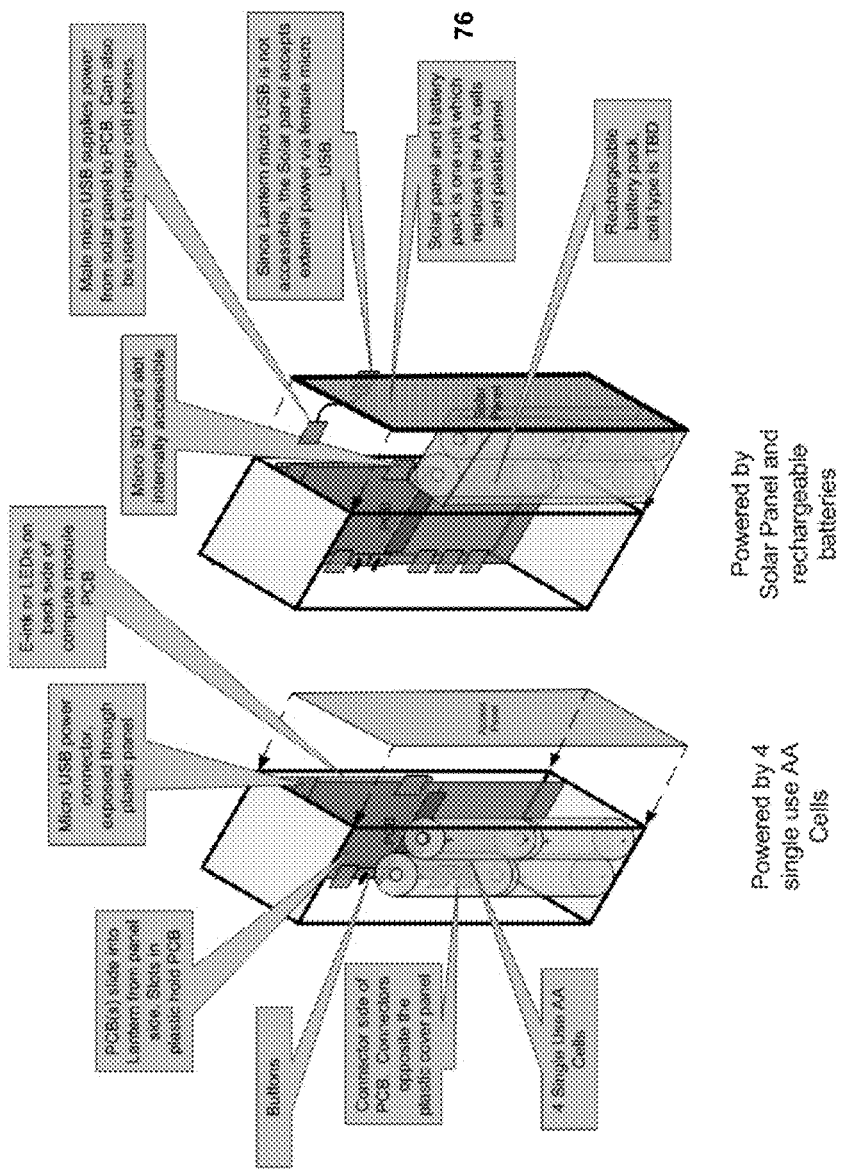
FIG. 4 is another diagram of the local storage device described herein, particularly showing certain hardware components thereof.

Referring now to FIG. 4, in order to minimize RF interference, the PCBs within the local storage device 20 are preferably mounted in the same plane at opposing ends of the enclosure—and connected together via 2 mm right angle headers and held in plane by slots in the plastic enclosure. The enclosure of the local storage device 20 will provide housing for four (4) AA cells. The enclosure panel will preferably be replaceable, in whole or in part, by a solar pack 76 that comprises a rechargeable battery pack and a solar panel. In such embodiments, the invention provides that power will be transferred from the solar pack 76 to the local storage device 20 via the same micro-USB connection 54 described above. The solar panel will preferably be configured to charge itself using external power (female micro-USB) or via the solar panel. In certain embodiments, the male USB connection from the solar pack 76 may also be used to charge compatible mobile phones and other devices. Still further, the invention provides that the local storage device 20 may include a set of capacitors or supercapacitors to store unused power generated by the solar panels.

In certain embodiments, the invention provides that a patch antenna may be included and positioned to be co-planar and/or integrated into the solar panel (or the surface area of a solar cell) of the local storage device 20. Alternatively, a solar cell surface area, with an integrated trace antenna, may be employed. In such embodiments, a solar cell/panel may be positioned on a printed circuit board (PCB) material (e.g., FR4 material), and be positioned within otherwise unused space of the PCB (which may be allocated for copper trace elements of the antenna, solder points for antenna leads, and/or ground plane for the antenna).

According to further preferred embodiments, the local storage device 20 includes a power button, a battery conservation button, and a system reset button. The reset button is preferably accessed through a pin hole 58 and consists of hardware. In such embodiments, pressing the reset button will immediately reset the hardware of the device 20. The power button is preferably a tactile momentary switch used to wake or power up the device 20. A third button preferably allows a user to enter and exit a battery conservation mode, such that pressing the button instructs the software of the device 20 to turn off certain hardware components (such as the WiFi, USB host controller port, and RF module 28). In such embodiments, the power conservation state will be maintained by the software and indicated via LED/e-ink display within a user interface.

As such, the local storage device 20 will preferably be operable in three power modes, namely, an off mode, power conservation mode, and full power mode. In addition, the invention provides that the LNB tone and polarization control circuitry will not be enabled unless the device 20 is operating in full power mode (and is being powered by a dedicated charging port). As mentioned above, the invention provides that the local storage device 20 may be powered through either the micro-USB port or four (4) AA batteries. In certain embodiments, the solar pack 76/rechargeable battery pack will provide power to the micro-USB port 54. The invention provides that if USB power is present, the device 20 hardware will utilize that power (instead of internal battery power).

Still further, each local storage device 20 may be equipped with a beacon signal functionality, which operates to inform users and local devices of (i) changes to signal frequencies, schedules, and waveforms, (ii) openings in transmit schedules (to prevent collisions during bi-directional communications), (iii) a location of the satellite at a defined point in time, or (iv) a combination of the foregoing.

As mentioned above, in certain embodiments, the system of the present invention is configured to automatically and directly communicate the data files 12 to one or more satellites 18 that are not being used at full capacity (versus those satellites 18 that are operating at or near full capacity). As described above, the one or more satellites 18 are preferably configured to then relay the data files 12 (in the form of radio frequency signals) to a plurality of local storage devices 20. In certain related embodiments, the system is configured to inform end users of the real-time usage status of satellite 18 capacity, thereby making such capacity viewable by and available to end users on an ad hoc, demand-based, and/or auction-driven basis. In such embodiments, excess satellite 18 capacity may be filled on a scheduled and/or last-second basis.

As demonstrated above, the systems and methods of the present invention may be deployed to provide an underserved population with access to a rich source of information that others enjoy and routinely extract from the Internet—which will serve to educate and better the lives of millions of people who do not have reliable access to the Internet. Likewise, the systems and methods described herein will have utility among those who typically do have Internet access, when such individuals are traveling or otherwise located in geographical areas with poor network coverage. Still further, the invention encompasses yet other ways to deploy the systems and methods described above. For example, the systems could be deployed to enable remote terminals to activate or deactivate distant electro-mechanical processes. In addition, the systems described herein can be deployed to offer web-controlled, satellite broadcast-enabled digital switches.

The many aspects and benefits of the invention are apparent from the detailed description, and thus, it is intended for the following claims to cover all such aspects and benefits of the invention that fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A system for obtaining data files from a plurality of third party servers and transmitting said data files to a plurality of users, which comprises at least one system server, at least one satellite, a plurality of local storage devices, and a compute module, wherein:
   (a) the system server is configured to download and save data files from a plurality of third party servers via an Internet connection and directly communicate the data files to the satellite;
   (b) the satellite is configured to relay the data files as radio frequency signals to the local storage devices;
   (c) each local storage device is configured to (i) receive and decode the radio frequency signals, (ii) store decoded radio frequency signals as transmitted data files, (iii) render the transmitted data files accessible to at least one user computing device through a wireless network connection, and (iv) allow a user to select from a plurality of options specific transmitted data files to access and review, wherein each local storage device comprises: an integrated antenna that is configured to receive the radio frequency signals from the satellite; one or more rechargeable batteries; one or more solar panels that are configured to generate power; wide band software that is capable of demodulating multiple types of waveforms; a user interface that indicates whether the local storage device is currently receiving radio frequency signals from the satellite and transmitting copies of selected transmitted data files to the at least one user computing device; and a radio frequency module that is configured to receive the radio frequency signals from the satellite and transfer the radio frequency signals to the compute module; and (d) the compute module is configured to (i) decode the radio frequency signals into the transmitted data files and store the transmitted data files for future consumption by users; (ii) establish a wireless network connection with the at least one user computing device; (iii) transmit copies of selected transmitted data files to the at least one user computing device through the wireless network connection; and (iv) regulate power usage and provide central processing unit (CPU) functionality.

2. The system of claim 1, wherein each local storage device comprises a beacon signal functionality, which operates to inform users and local devices of (i) changes to signal frequencies, schedules, and waveforms, (ii) openings in transmit schedules to prevent collisions during bi-directional communications, (iii) a location of the satellite at a defined point in time, or (iv) a combination of the foregoing.

3. The system of claim 1, wherein the system is configured to automatically and directly communicate the data files to a satellite that is not being used at full capacity.

4. The system of claim 1, which is further configured to provide users with real-time satellite capacity data, such that an amount of excess satellite capacity is made available to such users on an ad hoc, demand-based, or auction-driven basis.

* * * * *